July 29, 1958  D. L. ROBINSON  2,845,552
ELECTRIC MOTOR
Filed Sept. 26, 1955
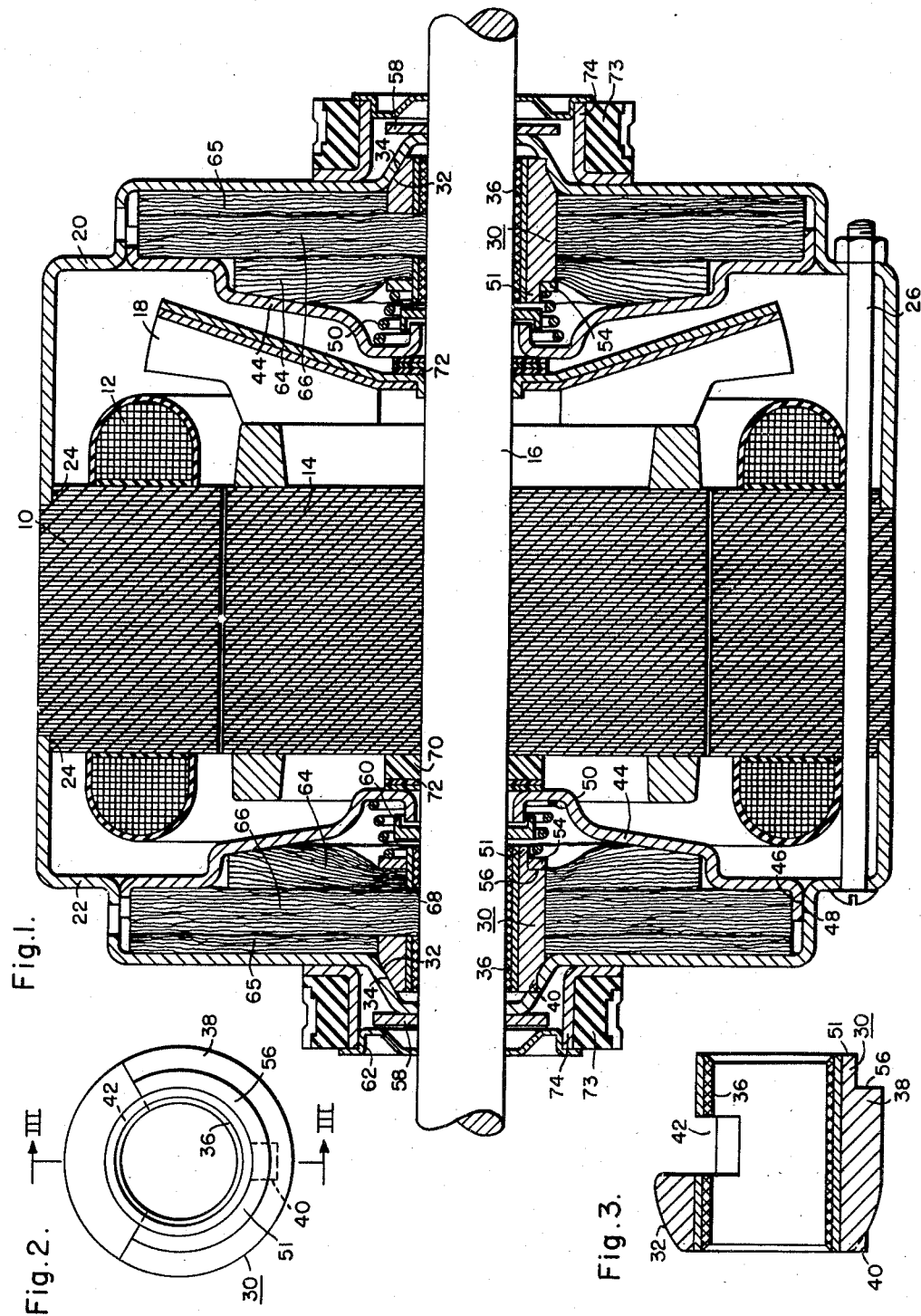

2,845,552

ELECTRIC MOTOR

Donald L. Robinson, Lima, Ohio, assignor to Westinghouse Electric Corporation, East Pittsburgh, Pa., a corporation of Pennsylvania Application September 26, 1955, Serial No. 536,482

4 Claims. (Cl. 310—90)

This invention pertains to electric motors, and more particularly to small electric motors used for driving fans, compressors and the like.

In small motors such as may be used for driving fans and compressors, it is desirable to have a motor that is inexpensive to manufacture and capable of long service with a minimum of attention. Sleeve bearings are usually used in such motors and the necessity of accurate alignment of the bearings adds substantially to the cost of manufacture. Such bearings also require frequent lubrication in service. It is desirable in such motors to have bearings with long life than can be operated for long periods of time without additional lubrication. It is also desirable that the bearings be of the self-aligning type so that they will seek their proper alignment with the motor shaft and eliminate the necessity of holding close concentricities between the various component parts of the motor during manufacture, thus reducing the cost. Self-aligning bearings of porous metal have sometimes been used heretofore in small motors, but such bearings have not been entirely satisfactory because of difficulty in obtaining adequate lubrication.

One object of this invention is to provide an electric motor which is of simple design, inexpensive to manufacture and capable of operating for extended periods with a minimum of attention.

A more specific object of this invention is to provide an electric motor of simple design having self-aligning bearings which are inexpensive to manufacture and are capable of operating for extended periods of time without additional lubrication.

These and other objects and advantages of this invention will be more easily understood from the following detailed description when taken in connection with the attached drawing, in which:

Figure 1 is a longitudinal section view of an electric motor showing one embodiment of this invention;

Fig. 2 is an end view of one of the self-aligning bearings used in the motor of Fig. 1; and Fig. 3 is a longitudinal section view of the bearing shown in Fig. 2 taken along line III—III of Fig. 2.

The motor shown in Fig. 1 has a laminated stator core 10, of more or less standard construction, with a stator winding 12 placed in slots in the stator core 10. The winding 12 may be of any desired type, such as a single-phase alternating current winding of shaded pole or other type. A rotor 14, shown as a squirrel cake rotor, is mounted on a motor shaft 16 by any desired means such as a press fit. Also mounted on the motor shaft at one end of the rotor 14 is a fan assembly 18 for circulating ventilating air through the motor. End brackets 20 and 22 having central openings are attached to each end of the stator core 10 by any desired means, such as a small shoulder or rabbet 24 formed on each end of the stator core 10 in which the end brackets 20 and 22 engage. A plurality of circumferentially spaced through bolts 26 pass through suitable openings in the end brackets 20 and 22 and the stator core 10 to secure the end brackets 20 and 22 to the stator core 10.

The end brackets 20 and 22 may be of any desired construction, but are preferably formed of sheet metal so that they may be easily fabricated by simple press operations, thus greatly reducing the cost of the finished motor. The motor shaft 16 is rotatably mounted in the end brackets 20 and 22 by means of a self-aligning sleeve bearing 30 at each end of the shaft. Each self-aligning bearing 30 is provided with a spherically shaped surface 32 at one end to engage spherical seats formed in the end brackets 20 and 22 respectively.

There is thus provided a motor which is relatively simple and inexpensive to manufacture. The stator core 10 serves the dual purpose of a stator core and motor frame, thus eliminating the cost of a motor frame and in addition allows the use of larger diameter stator laminations without increasing the diameter of the motor. The end brackets 20 and 22 are mounted on the stator core and are fabricated from sheet metal so that they are relatively inexpensive to manufacture. Each end bracket has a central opening for the motor shaft 16 and a spherical seat which is formed concentrically with the central opening in the end bracket for supporting the self-aligning bearings 30.

Each of the self-aligning bearings 30 consists of a bearing liner 36 which is mounted in a bearing cartridge 38 by any suitable means, such as a press fit. The bearing liner 36 may be of any desired bearing material such as bronze or may be a babbitt bearing backed up by a steel shell. A babbitt bearing is preferred if means may be provided for insuring a positive supply of a suitable lubricant. This invention provides means for supplying a positive flow of lubricant to the bearing and thus it is preferable to use a babbitt bearing. The outer cartridge 38 may be fabricated from any suitable material, but in order to reduce the cost of the finished product, it is preferably die-cast to its finished shape, eliminating the need for any additional machining, and thus should be made of a material which is suitable for die-casting. Such a material as aluminum or an aluminum alloy is suitable. Both the sleeve bearing 36 and the cartridge 38 are provided with a window 42 so that lubricant may be fed directly to the motor shaft 16. The cartridge is also provided with a small projection 40 at one end which fits in a recess formed in the end brackets. The projection 40 prevents the bearing from turning when the motor is operating by engaging the edge of the recess in the end bracket.

The self-aligning bearing 30 is installed in the end brackets so that the spherical surface 32 of the cartridge 38 engages a spherical seat 34 formed in each end bracket. After the bearing 30 is placed in the brackets, three ring-shaped wick member 64, 65 and 66 are placed in the brackets. The wick member 66 has a tongue 68 which projects through the window 42 formed in the bearing 30 into contact with the shaft 16. After the wick members 64, 65 and 66 are in place, a coil spring 50 and a washer 54 are placed in position so that one end of the spring 50 bears against the washer 54 which, in turn, engages a shoulder 56 which is formed on the end of the bearing cartridge 38. The end 51 of the bearing cartridge 38 projects beyond the washer 54 to provide a lip for centering the spring 50 where it seats on washer 54. Finally, a cup-shaped bearing retaining member 44 is attached to the end bracket so that the spring 50 is slightly compressed, thus urging the spherical surface 32 of the bearing 30 into engagement with the seat 34 of the end bracket. The bearing retainnig members 44 may be secured in the end brackets 20 and 22 by any desired means such as a press fit between the outer diameter 46 of the bearing retaining member and the inner diameter 48 of the end brackets. An oil flinger 60 is also provided on each end of the motor shaft 16 adjacent the bearing to prevent lubricant used in lubricating the bearings 30 from escaping from the oil reservoir formed by the end bracket and the member 44.

The combination of the bearing retaining members 44 and each of the end brackets 20 and 22 serves to form annular areas or oil reservoirs which surround each bearing 30 to retain a supply of lubricant for the bearings. Three wick members 64, 65 and 66 are placed in each of these oil reservoirs, and one of the wick members 66 has a tongue 68 which passes through the window 42 formed in each of the bearings 30, as described above. Thus, if the wick members are saturated with a suitable oil, they will form a reservoir of lubricant which will be positively fed directly to the motor shaft 16 by means of the tongue 68 formed on the wick member 66. The reservoir and wick members 64, 65 and 66 are capable of containing a supply of lubricant sufficient to lubricate the bearings 30 for an extended period, thus eliminating the need of replacement of the lubricant at frequent intervals. The bearing retaining member 44 is preferably fabricated of sheet metal in the same manner as the end brackets 20 and 22, thus reducing the cost of this item. The cost of manufacture is also greatly reduced by using a press fit between the retaining member 44 and the end brackets 20 and 22 rather than more expensive methods of fastening these members together.

The coil spring 50, which is slightly compressed by the bearing retaining member 44, will continually urge the spherical surface 32 of the bearing 30 into engagement with the spherical seat 34 of the end brackets, thus insuring an accurate bearing alignment and, consequently, an accurate alignment of the motor shaft 16 and rotor 14. The small projection 40 formed on the bearing cartridge 38 projects into a similarly shaped recess formed in each of the end brackets 20 and 22 and serves to properly position the bearings 30 so that the windows 42 are in their proper position and also serves to prevent rotation of the bearing when the motor is operating. The motor may be mounted in any suitable manner, and is shown as being provided with resilient mounting rings 73 of any suitable type placed on cylindrical members 74 attached to the end brackets and held in place by the extending edges of the dust caps 62.

A second oil flinger 58 is mounted on each end of the motor shaft 16 outside the bearings to prevent escape of oil from the motor and to return oil that escapes from the bearings to the oil reservoir. A dust cap 62 closes the central opening of each end bracket and serves to prevent the entry of dust and other foreign matter into the interior of the motor. A plurality of thrust washers 70 and 72 of any suitable type are provided at each end of the rotor 14 so that the end play of the motor shaft 16 may be adjusted to any desired limits. The washers 70 and 72 are formed of any suitable material, preferably nylon or a similar plastic material.

While this invention has been described with particular reference to one embodiment, it is adapted to several different types of construction employing the self-aligning bearings described above. For example, instead of using the coil spring 50, a V-shaped spring washer could be permanently attached to each of the bearing retaining members 44 to urge the bearing 30 into engagement with the end brackets. Also, the end brackets 20 and 22 and the bearing retaining member 44 could be die-cast or molded instead of formed of sheet metal, although where it is desired to produce an inexpensive product, it is preferable to form these parts from sheet metal as described above. The motor described is of the frameless type, but the bearings could easily be adapted to a motor employing a conventional frame and end brackets. It is, therefore, desired that this invention be not limited to the particular embodiment described, but only as required by the prior art.

I claim as my invention:

1. An electric motor comprising a stator member and a rotor member, said stator member having end brackets at each end thereof and the rotor member including a shaft passing through at least one of the end brackets, each of said end brackets having a central spherical seat formed therein, a sleeve bearing for the shaft in each of the end brackets, said bearing being of non-porous material and having a window therethrough, each of said bearings having a spherical surface at one end thereof engaging the spherical seat of the end bracket, a retaining member secured within each end bracket and forming a closed annular lubricant reservoir between the end bracket and the retaining member, means within said lubricant reservoir for resiliently holding the bearing in engagement with the end bracket, and means in each lubricant reservoir for supplying lubricant through said window directly to the shaft.

2. An electric motor comprising a stator member and a rotor member, said stator member having end brackets at each end thereof and the rotor member including a shaft passing through at least one of the end brackets, each of said end brackets having a central spherical seat and a small recess formed therein, a sleeve bearing for the shaft in each of the end brackets, each of said bearings having a spherical surface at one end thereof engaging the spherical seat of the end bracket and a small projection at the same end thereof engaging the small recess of the end bracket, said bearing being of non-porous material and having a window therethrough, a generally cup-shaped retaining member secured within each end bracket and forming a closed annular lubricant reservoir between the end bracket and the retaining member, compression spring means disposed around the shaft and engaging the other end of the bearing and the retaining member for holding the bearing in engagement with the end bracket, and means in each lubricant reservoir for supplying lubricant through said window directly to the shaft.

3. An electric motor comprising a stator member and a rotor member, said stator member having end brackets at each end thereof and the rotor member including a shaft passing through at least one of the end brackets, each of said end brackets having a generally cup-shaped portion and a central generally spherical seat, each of said generally spherical seats having a small recess therein, a sleeve bearing for the shaft in each of the end brackets, each of said bearings having a spherical surface and a small projection at one end thereof respectively engaging the spherical seat of the end bracket and the small recess in the end bracket, said bearing being of non-porous material and having a window therethrough, a generally cup-shaped retaining member fitting tightly within said cup-shaped portion of each end bracket and forming a closed annular lubricant reservoir therewith, compression spring means disposed around the shaft and engaging the other end of the bearing and the retaining member for holding the bearing in engagement with the end bracket, and means in each lubricant reservoir for supplying lubricant through said window directly to the shaft.

4. An electric motor comprising a stator member and a rotor member, said stator member having end brackets at each end thereof and the rotor member including a shaft passing through at least one of the end brackets, each of said end brackets having a generally cup-shaped portion and a central generally spherical seat, a sleeve bearing for the shaft in each of the end brackets, each of said bearings having a spherical surface at one end thereof engaging the spherical seat of the end bracket, said bearing being of non-porous material and having a window therethrough, a generally cup-shaped retaining member fitting tightly within said cup-shaped portion of each end bracket and forming a closed annular space therewith, means accessible from outside the motor permitting the addition of lubrciant to said space, wicking substantially filling said closed annular space for supplying lubricant through said window to the shaft, and compression spring means disposed around the shaft and engaging the other end of the bearing and the retaining member for holding the bearing in engagement with the end bracket.

References Cited in the file of this patent

UNITED STATES PATENTS

| | | |
|---|---|---|
| 552,961 | Jackson et al. | Jan. 14, 1896 |
| 928,771 | Kunkel | July 20, 1909 |
| 982,165 | Whitney | Jan. 17, 1911 |
| 1,400,055 | Gysel | Dec. 13, 1921 |
| 1,677,936 | Thordarson | July 24, 1928 |
| 1,896,972 | Redmond | Feb. 7, 1933 |
| 1,978,484 | Aufiero | Oct. 30, 1934 |
| 2,046,982 | Warren | July 7, 1936 |
| 2,448,500 | Turner | Aug. 31, 1948 |
| 2,484,166 | Huston | Oct. 11, 1949 |
| 2,668,086 | Marzolf | Feb. 2, 1954 |